Jan. 3, 1933.  C. S. HOUPT  1,892,950
REMOVING OF ENAMEL FROM A METAL BASE
Filed March 5, 1931
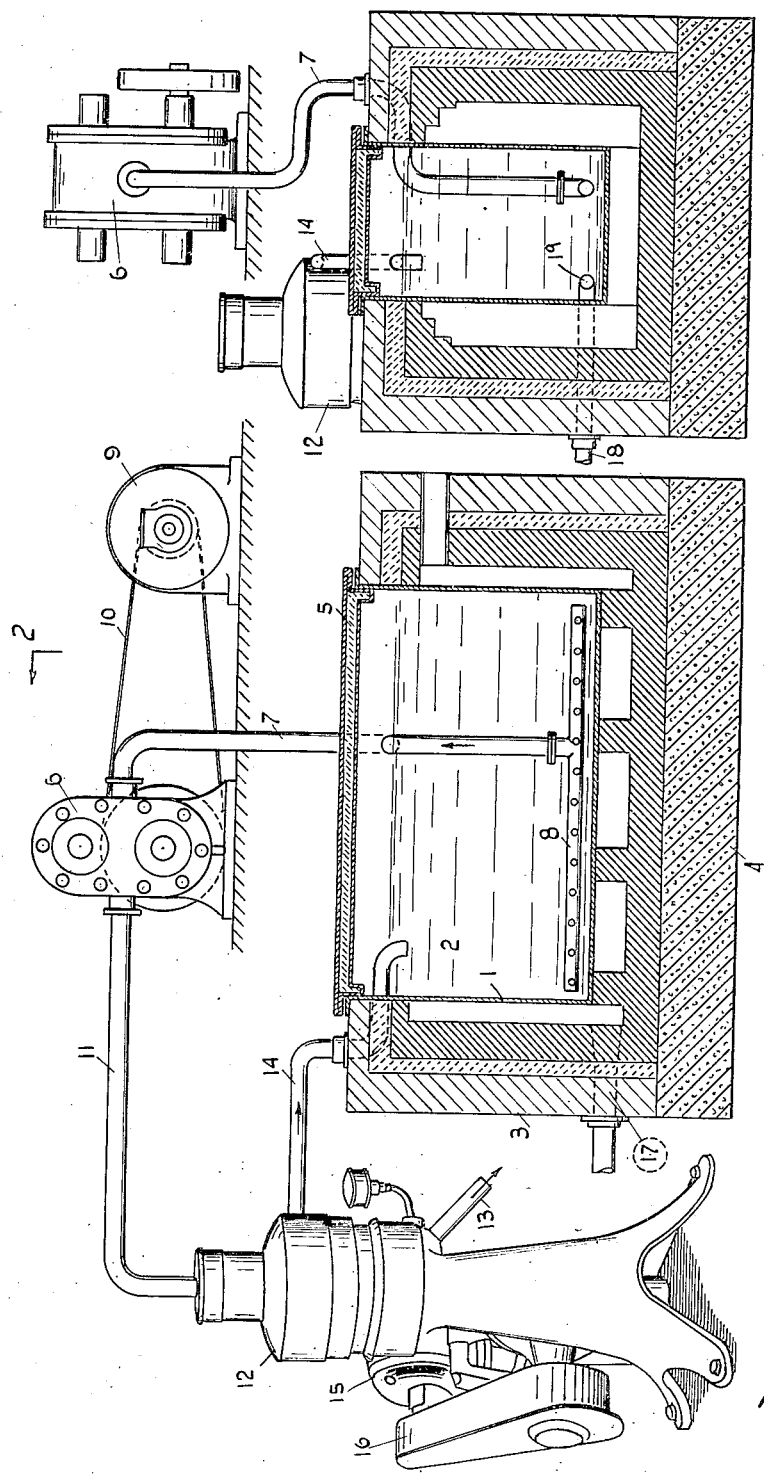
INVENTOR.
CLAYTON S. HOUPT
Barnes and Kisselle
ATTORNEY.

Patented Jan. 3, 1933

1,892,950

UNITED STATES PATENT OFFICE

CLAYTON S. HOUPT, OF DETROIT, MICHIGAN

REMOVING OF ENAMEL FROM A METAL BASE

Application filed March 5, 1931. Serial No. 520,426.

This invention relates to the removing of enamel from a metal base and is more particularly cocerned with the removal of porcelain, low fusing glass, and vitreous enamels from a ferrous base.

In my co-pending application Serial No. 479,939, filed September 5, 1930, I have disclosed a method and apparatus for removing enamel from a metal base in which I propose to use a bath composed of a solution of caustic soda. During the operation of this type of bath the solution is gradually depleted and the reaction of the bath with the enamel forms a sludge which is dispersed throughout the bath consequently causing a gradual increase in the time required to remove the enamel. The formation of sludge in the caustic soda solution deenameling bath presents a serious problem and must be removed.

Heretofore the removal of the sludge has been achieved in various ways. It has been proposed to place a perforated tray on the bottom of the tank. When agitation of the bath ceases, the sludge settles upon this perforated tray and every so often the tray becomes filled with sludge and is removed, the perforations permitting the seepage of the solution therethrough but retaining the sludge. This method is not only very inefficient insofar as the removal of the sludge is concerned but is inefficient from the operating standpoint since it requires the bath which is operated at a temperature in the neighborhood of 320° F. to be cooled. Furthermore, this method of removing the sludge requires the deenameling process to be temporarily suspended. It has also been proposed to remove the sludge by first siphoning off the clear solution above the sludge and then removing the sludge and cleaning out the tank. This operation is obviously very inefficient because it requires an additional tank for holding the clear solution while the sludge is being removed, requires the suspension of the de-enameling operation and can be effected only after the solution has been cooled.

It is the object of this invention to overcome the above named difficulties in the removing of enamel from a metal base and this has been achieved by removing, preferably continuously, the sludge as it forms without in any wise hindering or suspending the de-enameling operation. Hence, it is the object of this invention to produce a method and apparatus for removing enamel from a metal base which can be continuously operated at a substantially constant de-enameling rate.

With this type of caustic soda de-enameling bath, the sludge, owing to the agitation of the bath by the heating apparatus, is dispersed through the bath. The sludge which reaches the surface forms a film across the surface and the caustic soda gradually crystallizes out of the solution causing this film to gradually harden and increase in thickness. Obviously owing to the heat of the bath this is dangerous because the gases are confined within the tank by this incrustation over the top of the bath and eventually the crust gives way to the steam pressure beneath it causing an explosion which endangers the workmen and the apparatus. This danger and disadvantage is obviated by my apparatus which keeps the bath free from sludge and prevents the formation of a crust over the surface of the bath with its concomitant dangers.

In the drawing:

Fig. 1 is a composite sectional and elevational view of the apparatus.

Fig. 2 is a section along the line 2—2 of Fig. 1.

Referring more particularly to the drawing, I have shown a tank 1 which is arranged to be suspended within a combustion chamber 2. The combustion chamber 2 is defined by the walls 3 and the base 4 as described in my co-pending application above note. It is understood that the caustic solution in the tank 1 can be of any strength but preferably I use a solution composed of ten pounds of caustic soda to one gallon of water which has a boiling point in the neighborhood of 320° F. This solution can be heated by any suitable apparatus and preferably the type of heating apparatus disclosed in my co-pending, above-mentioned application.

The tank 1 is provided with a suitable removable insulated cover 5.

After the caustic soda solution bath has been heated to the proper temperature and the articles which are to be de-enameled placed therein, it is found that the solution gradually becomes contaminated with a sludge formed by the reaction of the caustic soda with enamel that has been removed from the base metal and the action of the caustic soda bath is hereby retarded. With a solution of ten pounds of caustic soda to one gallon of water maintained at a temperature of approximately 320° F., an ordinary coating of enamel will be removed initially in the neighborhood of one-half hour, but if the sludge is not removed and additional caustic soda added to maintain the strength of the solution, the time for de-enameling will gradually increase. To obviate this difficulty I propose to connect the tank with a pump 6 by means of the pipe line 7 which in turn is connected to a perforated pipe 8 closed at each end and positioned adjacent the bottom of the tank. The pump 6 is operated by the motor 9 and associated belt 10. During the operation of the tank the sludge gradually forms and settles to the bottom where it is sucked with the associated solution through the perforated opening in the pipe 8 and thence through the pipe 7 to the pump 6 which in turn delivers it through the pipe 11 to the clarifier 12. The clarifier 12 may be any of the well-known clarifiers of the centrifuge type. The clarifier 12 by centrifugal action separates the sludge from the solution. The sludge is discharged through the discharge pipe line 13 and the clarified solution returned to the tank through the pipe 14. The clarifier 12 may be operated by the motor 15 and associated belt 16.

In the operation of this de-enameling apparatus the tank 1 can be filled to any desired level with the caustic soda solution bath which may be heated as described in my co-pending application by the gas burners 17 to a temperature in the neighborhood of 320° F. The work is then placed in the bath, the cover 5 properly positioned over the mouth of the tank and the motors 9 and 15 set in operation. At this time the sludge gradually settles to the bottom where it is removed by the pump 6 through the perforated pipe 8 and intake pipe 7. The pump 6 then discharges the liquid through the pipe 11 into the clarifier 12 where the sludge is separated from the clarified solution and discarded. The clarified solution is returned to the tank through the pipe 14. From time to time additional caustic soda can be added directly to the bath by removing the cover 5 to bring the solution to the proper strength.

When additional water is needed I propose to add the same in the form of steam. To this end the apparatus is provided with a steam pipe 18 which passes through the insulating walls and discharges through the perforated outlet pipe 19 into the tank below the surface of the de-enameling bath. By replenishing the water in the form of steam I obviate the danger of explosion which always happens in case water is directly added to a caustic solution bath of this type at these high temperatures. Since the steam is already in the form of a gas no violent reaction occurs when the steam is admitted into the tank to replenish the water of the bath solution. The perforated steam outlet pipe 19 is similar to the pipe 8 and extends longitudinally of the tank adjacent one side similarly to pipe 8.

I claim:

1. The method of removing enamel from a metal base comprising immersing the enameled base in a heated aqueous solution of caustic soda, the caustic soda reacting with the enamel to remove the same from the metal base and to form a sludge, and separating the sludge from the bath during the operation of the same.

2. The method of removing enamel from a metal base comprising immersing the enameled base in an aqueous solution of caustic soda maintained substantially at the boiling point, the said caustic soda reacting with the enamel to remove the same from the metal base and to form a sludge and continuously separating the sludge from the bath during the operation thereof.

3. The method of removing enamel from a metal base comprising immersing the base in an aqueous bath of caustic soda comprising substantially ten pounds of caustic soda to a gallon of water, heating the caustic soda substantially to its boiling point, the caustic soda solution reacting with the enamel to remove the same from the base and to form a sludge which is dispersed throughout the bath, drawing off a part of the bath, separating the sludge from the caustic soda solution, returning the clarified bath solution to the bath and discarding the sludge.

4. The method of removing the enamel from a metal base comprising immersing the enamel base in an aqueous solution of caustic soda, heating the caustic solution to substantially 320° F., the caustic soda solution reacting with the enamel to remove the same and to form a sludge, continuously drawing off some of the solution and subjecting the same to centrifugal action to separate the sludge from the caustic soda solution, returning the clarified bath solution to the bath and discarding the sludge.

5. A method for removing enamel from a metal base comprising immersing the base in a heated bath of caustic soda solution, the said bath reacting with the enamel to remove the same and to form a sludge, separating a portion of the bath during the de-enameling operation, removing the sludge from such separated portion by centrifugal action, returning the clarified portion of the solution to the bath and discarding the sludge whereby the de-enameling process may be carried on continuously.

In testimony whereof I affix my signature.
CLAYTON S. HOUPT.